3,334,014
DIHYDROFUSIDIC ACID
Wagn Ole Godtfredsen, Copenhagen, Denmark, assignor to Lovens Kemiske Fabrik Produktionsaktieselskab, Ballerup, Denmark, a firm
No Drawing. Filed Nov. 14, 1962, Ser. No. 238,076
Claims priority, application Great Britain, Nov. 15, 1961, 40,916/61
The portion of the term of the patent subsequent to Jan. 7, 1980, has been disclaimed
6 Claims. (Cl. 167—65)

This invention relates to a new antibacterially active compound which is a derivative of fusidic acid.

Fusidic acid has previously been described and is, e.g. under the name of Antibiotic ZN–6 disclosed in my co-pending U.S. patent application Ser. No. 138,234, applied for by me along with my co-inventors of that subject matter, Henning Otto Bojsen Lorck and Sverre Jahnsen, which has since become U.S. Patent 3,072,531.

Fusidic acid is an antibiotic of an interesting chemical structure, being a cyclopentenopolyhydrophenanthrene derivative which in the 17-position is connected by a double bond with the α-carbon atom of 5-methyl-4,5-heptenoic acid. It is producible by fermentation of the fungus *Fusidium coccineum* Fuck (K. Tubaki) in an appropriate culture medium which method will be described in detail later.

More particularly the present invention relates to dihydrofusidic acid, its salts with bases, and to methods of producing the acid and its salts.

Dihydrofusidic acid has the molecular formula $C_{31}H_{50}O_6$ and contains in the molecule a cyclopentenopolyhydrophenanthrene ring system which is substituted with two hydroxy groups, one acetoxy group, and four methyl groups, and which in the 17-position is connected by a double bond with the α-carbon atom of 5-methyl-heptanoic acid.

Dihydrofusidic acid is believed to have the structural Formula I below, in which the wavered connection-lines indicate that the orientation of the groups in question has not yet been established with certainty.

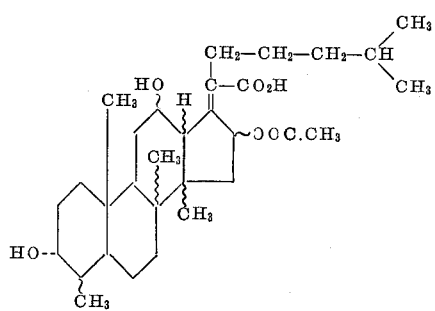

(I)

Thus it will be understood that dihydrofusidic acid is derived from fusidic acid by saturation of the isolated double bond of the latter.

Dihydrofusidic acid is a weak acid. An electrometric titration performed in 50 percent aqueous ethanol gave a $pK_a$-value of 6.3 corresponding to a $pK_a$-value of about 5.3 in water. Furthermore, the titration studies indicate an equivalent weight of the substance amounting to 518.

In the ordinary methods of isolating dihydrofusidic acid this is obtained in the form of its crystalline solvate with water, containing half a mole of crystal water. The characteristic features of this solvate are as follows: Melting point: 182 to 184 degrees centigrade; specific rotation—$[\alpha]_D^{20}$ (in chloroform)—minus ½°; ultraviolet spectrum (in ethanol): absorption maximum at 220 mµ with a molar extinction coefficient of 8300.

Dihydrofusidic acid is further characterized by its spectrum in the infra-red region, using the potassium bromide technique, which it exhibits characteristic absorption bands at the following frequencies expressed in microns:

| | |
|---|---|
| 2.90 (hydroxy) | 8.85 |
| 5.82 (carbonyl) | 9.31 |
| 7.28 | 9.53 |
| 7.95 (acetoxy) | { 9.71 |
| | 10.27 |

Dihydrofusidic acid itself is sparingly soluble in water. It is, however, capable of forming a variety of salts with inorganic or organic bases, many of which salts may be used for therapeutic purposes. Among the interesting salts which have been prepared are the water-soluble sodium-, potassium-, and ammonium salts; salts with pharmaceutically acceptable amines, such as triethylamine, diethylaminoethanol, piperidine, morpholine, cyclohexylamine, and ethanolamines; and salts which are sparingly soluble in water, viz. calcium, magnesium, dibenzyl-ethylene-diamine, benzyl-β-phenylethylamine, and procaine salts.

As to other salts which can be produced according to the method of the invention mention may be made of, e.g., those containing as the base-component pyrrolidine, piperazine, guanidine, methyl-amine, ethylamine, benzylamine, or similar unsubstituted or substituted amines. Furthermore, quaternary ammonium compounds as choline and its derivatives, or other antibiotics having basic properties, as for instance streptomycin, form salts according to the invention, which have similar properties.

According to tests made in connection with the present invention it has been found that dihydrofusidic acid and its salts have a great antibacterial effect on a number of pathogenic micro-organisms.

Furthermore, it has been found that dihydrofusidic acid has an even greater effect on certain micro-organisms than fusidic acid proper, as will appear from the following table, in which the concentrations which cause a 50 percent inhibition are given in µg./ml.:

| | Fusidic Acid, µg./ml. | Dihydrofusidic Acid, µg./ml. |
|---|---|---|
| C. diphtheriae | 0.005 | 0.005 |
| Staph. aureus (penicillin-sensitive) | 0.06 | 0.04 |
| Staph. aureus (penicillin-resistant) | 0.045 | 0.025 |
| Bacillus subtilis | 0.17 | 0.08 |

According to the present method, dihydrofusidic acid is produced from fusidic acid by a selective hydrogenation of the double bond in the side-chain. According to the said method any of the known procedures for hydrogenating a C=C double bond may be employed. In an appropriate embodiment of this invention, however, the double bond is saturated by a catalytic hydrogenation, using for this purpose a noble-metal catalyst, e.g., platinum oxide; palladium on charcoal or on calcium or strontium carbonate, or other carriers capable of modifying the activity of the catalyst in a desirable direction; ruthenium; or Raney nickel.

The catalytic hydrogenation is advantageously performed at atmospheric pressure, or at slightly increased hydrogen pressure, and in the presence of a suitable reaction medium, preferably a solvent for fusidic acid, such as ethanol, dioxane, methyl- or ethyl "Cellosolve," or the like solvents or mixtures thereof, and insofar as certain salts of fusidic acid are used as starting substances, the hydrogenation may take place in an aqueous medium, or in mixtures of water and suitable organic solvents, such as lower alcohols.

Alternatively, the hydrogenation may be performed by electrolysis, in which case an aqueous solution of a salt of fusidic acid can be advantageously employed.

Generally, the hydrogenation process may take place at room temperature, or it may be performed at higher temperatures, and for the period required to accomplish the desired selective hydrogenation.

The isolation of dihydrofusidic acid or a salt thereof may take place after any catalyst present has been filtered off by evaporation of the solvent and decrystallization of the residue from a suitable solvent, or a mixture of solvents, in order to purify the dihydrofusidic acid or the salt in question thus obtained. If desired, the isolated free acid can subsequently be converted into one of its salts by means of known methods, such as neutralizing a solution of the acid with the appropriate base.

It has been found that dihydrofusidic acid in addition to having the same favourable ratio of resorption as fusidic acid is less toxic than the latter.

The said lower toxicity of dihydrofusidic acid has been determined by animal experiments in which the test animals—mice—were given the drug intravenously, subcutaneously, or orally. The results will appear from the table below in which the figures represent $LD_{50}$ expressed in mg. of drug administered per kg. of body weight:

| Form of Administration | $LD_{50}$, mg./kg. | |
|---|---|---|
| | Sodium salt of fusidic acid | Sodium salt of dihydrofusidic acid |
| Intravenous | 205 | 180 |
| Subcutaneous | 313 | 1,880 |
| Oral | 975 | 3,000–4,000 |

For clinical treatments the water-soluble salts of dihydrofusidic acid, and particularly the sodium or potassium salts are suitable.

On the other hand, salts of dihydrofusidic acid which are sparingly soluble in water are also applicable and may for instance be injected in the form of a suspension in a suitable liquid carrier in order to produce longer blood levels of the said antibiotic compound.

In pharmaceutical compositions the dihydrofusidic acid, or one or more of its salts with pharmaceutically acceptable bases, may conveniently be mixed with pharmaceutical, organic or inorganic, solid or liquid carriers suitable for enteral, parenteral, or local administration, as for instance water, gelatine, lactose, starch, magnesium stearate, talc, vegetable and animal oils and fats, benzyl alcohol, gum, polyalkylene glycol, petroleum jelly, cocoa butter, lanolin, or other known carriers for medicaments, while stabilizing agents, wetting or emulsifying agents, salts for varying the osmotic pressure, or buffers for securing an adequate pH-value of the composition can furthermore be used as auxiliary agents.

One of the preferred forms of administration is oral administration for which purpose capsules, pills, or tablets, and possibly enteric coated pills or tablets containing the sodium salt of fusidic acid, may be applied.

As an example of such a usable tablet mention may be made of the following composition:

| | G. |
|---|---|
| Sodium salt of dihydrofusidic acid | 250 |
| Lactose | 165 |
| Polyvinylpyrrolidone | 7 |
| Corn starch | 50 |
| Talc | 25 |
| Magnesium stearate | 3 |

The sodium salt of dihydrofusidic acid and the lactose are screened through a 20 mesh sieve and mixed for 15 minutes. Then the mixed powers are wetted with a solution of polyvinylpyrrolidone in 96 percent ethyl alcohol. The wetted mass is passed through a 10 mesh screen, and then dried at 38 degrees centigrade. When the alcohol has evaporated, the granules are broken on a 16 mesh sieve and mixed with the corn starch, talc, and magnesium stearate. The granules are compressed into tablets of 0.50 g. weight using $16/32$ inch punches and dies, yielding 1000 tablets each containing 0.250 g. of the sodium salt of dihydrofusidic acid.

As far as other possible forms of administration are concerned, the chemical stability of dihydrofusidic acid, however, is an important feature which in connection with the favourable properties of dihydrofusidic acid in general will have the result that compositions containing this compound can be worked up into a variety of other known pharmaceutical forms of preparations, which furthermore may contain other therapeutically active components that may contribute to increasing the scope of utility of the preparation.

In the clinical treatment of infectious diseases with dihydrofusidic acid or its salts the drug in question may preferably be administered in daily doses of 300 to 3000 mg., appropriately taken in 2 to 6 daily dosage units in one of the above-mentioned pharmaceutical forms of presentation.

From the following examples the details of the embodiments of the invention will be apparent.

It is to be noted, however, that Example 1, which merely concerns the preparation of the starting substance fusidic acid, is taken from my aforesaid pending U.S. patent application Ser. No. 138,234, now U.S. Patent 3,072,531, and does not form part of the present invention. Furthermore, all of the following examples are intended as an illustration and not a limitation of the present invention.

EXAMPLE 1

*Preparation of fusidic acid*

In a 1.5 m.³ fermentation tank of stainless steel equipped with an agitator 1.00 m.³ of a culture medium of the following composition was made up:

| | Kg. |
|---|---|
| Glucose | 20.0 |
| Meat and bone meal | 20.0 |
| Glycerol | 7.5 |
| Corn steep liquor (50 percent dry substance) | 2.5 |
| NaCl | 4.0 |
| $MgSO_4$ | 0.05 |
| Tap-water up to 1000 l. | |

The culture medium had pH=6.1, which value was adjusted to 6.5 by a diluted solution of NaOH being added, whereupon the medium was sterilized by heating. After cooling it was inoculated with 3 litres of a culture of *Fusidium coccineum* Fuck (K. Tubaki) (the fungus is obtainable under the said name from Centralbureau voor Schimmelcultures, Baarn, Holland) grown for 48 hours in a shaking flask at 28 degrees centigrade. The contents of the tank were stirred and aerated at a rate of 0.6 m.³ of air per hour at 28 degrees centigrade for 96 hours. During this period it was not necessary to adjust the pH in order to maintain the aforementioned value of 6.5. After the said period of fermentation the antibiotic activity of the culture medium determined by the usual agar cup test on *Staphylococcus aureus* was found to correspond to a content of 70 mg. of fusidic acid per litre by comparing it with the activity of that substance determined by the same method.

The mycelium was separated from the culture medium by filtration, and the amount of filtrate was 700 litres. The pH of the filtrate was adjusted to 3.3 by adding a 25 percent solution of $H_2SO_4$, and the filtrate was extracted with 230 litres of butyl acetate in counter-current in a Podbielniak extractor. The butyl acetate phase thereby obtained was extracted with one portion of 77 litres of water to which a 10 percent solution of NaOH was added until the pH of the aqueous phase was 10.0, whereupon the aqueous phase was separated from the butyl acetate phase. The pH of the aqueous phase was adjusted to 3.2 by adding a 25 percent solution of $H_2SO_4$, and the solution was extracted with 40 litres of methylisobutyl ketone. The methylisobutyl ketone phase was separated from the aqueous phase, treated with 40 g. of active carbon, and subsequently evaporated to dryness in vacuo at a boiling temperature of 25 degrees centigrade. The residue was dissolved in 500 ml. of benzene, and the solution was left standing overnight in a refrigerator. Thereby, a benzene solvate of fusidic acid crystallized. It was filtered off and recrystallized from benzene, yielding 12.0 g. of the pure solvate.

500 mg. of the benzene solvate thus produced was suspended in 20 ml. of water, and to the suspension was added N/2 aqueous NaOH until pH=9.5. The solution was filtered, and to the filtrate was added 50 ml. of n-butanol, whereupon the water content of the solution was removed by azeotropic distillation in vacuo. From the residue the desired soduim salt was precipitated by addition of ether. It was filtered off, washed with ether, and dried. By recrystallization from ethanol-acetone 360 mg. of the pure, crystalline sodium salt of fusidic acid was obtained.

EXAMPLE 2

Dihydrofusidic acid

A solution of 7.5 g. of fusidic acid in 50 ml. of 96 percent ethanol was shaken at room temperature under a hydrogen pressure of one atmosphere in the presence of 1.5 g. of 5 percent palladium on calcium carbonate. In 40 minutes 370 ml. of hydrogen was absorbed, and the consumption ceased. The catalyst was removed, and the filtrate was precipitated with water to yield 7.4 g. of material with a melting point of 182 to 184 degrees centigrade. For analytical purposes a sample was recrystallized from benzene, and finally from ether. Melting point: 182 to 183 degrees centigrade.

By substituting 1 g. of Raney nickel for the palladium, and at a pressure of 3 atmospheres, the same amount of dihydrofusidic acid was obtained.

*Analysis.*—Calcd. for $C_{31}H_{50}O_6 \cdot \frac{1}{2}H_2O$: C, 70.55; H, 9.74. Found: C, 70.48; H, 9.76.

EXAMPLE 3

The sodium salt of dihydrofusidic acid

To a suspension of 5.19 g. of dihydrofusidic acid in 25 ml. of ethanol, 1.2 ml. of 33 percent aqueous sodium hydroxide was added under stirring. 50 ml. of acetone was added to the resulting solution in order to precipitate the sodium salt, which after standing was filtered, washed with acetone, and dried.

The infra-red spectrum (KBr) showed strong absorption bands at 7.85, 7.22, 6.38, 5.85, 3.41, and 2.95 microns.

EXAMPLE 4

The sodium salt of dihydrofusidic acid

A solution of the sodium salt of fusidic acid (55 g.) in absolute ethanol (500 ml.) was shaken at room temperature under one atmosphere of hydrogen in the presence of 5 percent palladium on calcium carbonate (10 g.). When 2.57 l. of hydrogen was absorbed the hydrogenation was stopped, and the catalyst removed by filtration.

The filtrate was concentrated in vacuo to 250 ml., and acetone (250 ml.) was added. After standing, the sodium salt of dihydrofusidic acid, which separated, was collected, washed with acetone, and dried.

EXAMPLE 5

The calcium salt of dihydrofusidic acid

To a solution of the sodium salt of dihydrofusidic acid (520 mg.) in methanol (5 ml.) was added 20 percent aqueous calcium acetate (1 ml.). The crystalline calcium salt of dihydrofusidic acid, which separated, was collected, washed with water, and dried. Melting point: 214 degrees centigrade (dec.).

EXAMPLE 6

The N-methylcyclohexylamine salt of dihydrofusidic acid

To 5 ml. of a 10 percent solution of dihydrofusidic acid in acetone was added N-methylcyclohexylamine (0.15 ml.). The crystalline precipitate, which formed, was collected and recrystallized from methanol-acetonitrile to yield 520 mg. of the desired product with melting point: 194.0 to 194.5 degrees centigrade.

In a similar way the salts with triethylamine, diethylaminoethanol, piperidine, morpholine, cyclohexylamine, mono- and di-ethanolamine, dibenzyl-ethylene-diamine, benzyl-β-phenylethylamine, and procaine salt, respectively, were prepared.

It will of course be understood that the particular compound of the invention which, throughout the preceding part of this specification, and also in the claims, is called simply dihydrofusidic acid, could properly more specifically be called 24,25-dihydrofusidic acid, since it will be evident that the two hydrogens found in it which are not also in fusidic acid are at what in steroid positioning terminology are the 24 and 25 positions.

What is claimed is:

1. As a new compound, the α,β-unsaturated monocarboxylic acid called dihydrofusidic acid; having antibacterial properties; whose spectrum in the infra-red region, using the potassium bromide technique, exhibits characteristic absorption bands at the following frequencies expressed in microns: 2.90, 5.82, 7.28, 7.95, 8.85, 9.31, 9.53, 9.71, and 10.27; having at 220 mµ a molar extinction coefficient of 8300 in ethanol, and no characteristic absorption bands above this wave length; having a specific rotation $[\alpha]_D^{20}$ of minus ½° in a 1 percent solution in chloroform; having the molecular formula $C_{31}H_{50}O_6$, and containing in the molecule a cyclopentenopolyhydrophenanthrene ring system which is substituted with two hydroxy groups, one acetoxy group, and four methyl groups, and which in the 17-position is connected by a double bond with the α-carbon atom of 5-methylheptanoic acid; forming with water the crystalline hydrate $C_{31}H_{50}O_6 \cdot \frac{1}{2}H_2O$ which melts at 182 to 184 degrees centigrade, and forming salts with inorganic and organic bases.

2. The crystalline hydrate of dihydrofusidic acid as defined in cliam 1.

3. The salts of dihydrofusidic acid as defined in claim 1 with inorganic and organic bases.

4. The sodium salt of dihydrofusidic acid as defined in claim 1.

5. The potassium salt of dihydrofusidic acid as defined in claim 1.

6. The calcium salt of dihydrofusidic acid as defined in claim 1.

References Cited

UNITED STATES PATENTS 2,498,574   2/1950   Peck _____ 260—205
3,072,531   1/1963   Godtfredsen et al. _____ 167—65

FOREIGN PATENTS 581,651   8/1959   Canada.
785,191   10/1957   Great Britain.

OTHER REFERENCES

Allinger et al.: "The Structure of Helvolic Acid. III," J. Org. Chem. 26(11): 4522–4529, November, 1961.

(Other references on following page)

Arigoni et al.: "Location of the Ring C Hydroxyl Group in Fusidic Acid," Experientia 19(10): 521–522 (1963), abstracted in Chem. Abstracts 60:644g, Jan. 6, 1964.

Baird et al.: "Cephaldsporin $P_1$," Proc. Chem. Soc. (London) pp. 257–258, July 1961.

Bucourt et al.: "Structure and Stereochemistry of Fusidic Acid, a Steroidal Antibiotic," Compt. Rend. 257(18): 2679–82 (1963); abstracted in Chem. Abstracts 60:4211f, Feb. 17, 1964.

Burton et al.: "Cephalosporin $P_1$ and Helvolic Acid," Biochem. J. 62(1), pp. 171–6, January 1956.

Cram et al.: "Mold Metabolites VIII. Contribution to the Elucidation of the Structure of Helvolic Acid," J. Am. Chem. Soc. 78(20), pp. 5275–84, Oct. 20, 1956.

Godtfredsen et al.: (II), pp. 928–937, Lancet I (7236): May 5, 1962.

Godtfredsen et al.: (III), "The Structure of Fusidic Acid," Tetrahedron 18(9): 1029–1048, September 1962.

Halsall et al.: "The Molecular Formula of Cephalosporin $P_1$," Proc. Chem. Soc. 1963, p. 16; per Chem. Abstracts 59:7583e (1963).

Melera et al.: "Constitution of Helvolic Acid and Cephalosporin $P_1$," Experientia 19(11): 565–6 (1963); abstracted in Chem. Abstracts 60:588g, Jan. 6, 1964.

LEWIS GOTTS, *Primary Examiner.*

S. K. ROSE, *Assistant Examiner.*